United States Patent [19]
Vojtech

[11] Patent Number: 5,063,860
[45] Date of Patent: Nov. 12, 1991

[54] METHOD AND APPARATUS FOR MELTING MATERIALS CONTAINING INORGANIC MATERIAL FIBERS BY THE SUPPLY OF OXYGEN RICH GAS

[75] Inventor: Strnad Vojtech, Helsingborg, Sweden

[73] Assignee: Isover Saint-Gobain, Courbevoie, France

[21] Appl. No.: 480,827

[22] Filed: Feb. 16, 1990

[30] Foreign Application Priority Data

Feb. 23, 1989 [SE] Sweden ................. 8900635

[51] Int. Cl.$^5$ .............................. F23G 5/00
[52] U.S. Cl. ..................... 110/256; 110/259; 110/346
[58] Field of Search ............... 110/256, 259, 251, 248, 110/346

[56] References Cited

U.S. PATENT DOCUMENTS

| 2,125,517 | 8/1938 | Nicol | 110/256 |
| 3,801,082 | 4/1974 | Anderson | 110/256 |
| 4,471,702 | 9/1984 | McKinlay | 110/256 |
| 4,728,081 | 3/1988 | Nishino et al. | 110/256 |
| 4,732,091 | 3/1988 | Gould | 110/256 |
| 4,850,289 | 7/1989 | Beausoleil et al. | 110/256 |

FOREIGN PATENT DOCUMENTS 0137881 10/1983 European Pat. Off. .
0319680 10/1988 European Pat. Off. .

OTHER PUBLICATIONS

Patent Abstracts of Japan, vol. 7, No. 7 (C-144)(1152), Jan. 12, 1983, & JP-A-57 166 333 (Asahi Fiber Glass K.K.) 10/13/1982*.

Primary Examiner—Henry C. Yuen
Attorney, Agent, or Firm—Oblon, Spivak, McClelland, Maier & Neustadt

[57] ABSTRACT

For melting an inorganic fiber which is mixed with an organic substance, the inorganic fiber material and organic substance are heated in a furnace to a temperature sufficient for the organic material to combust, and sufficient oxygen enriched gas is fed to the furnace that the combustion of the organic substance produces sufficient heat to melt the inorganic material. The oxygen enriched gas is preferably oxygen enriched air having an oxygen content of at least 40% by volume. It should be fed in sufficient quantity to heat material having an adiabatic temperature of at least 850° C., and preferably 1200° C. which permits the melted inorganic material to freely flow out of the furnace. The oxygen enriched gas is preferably fed to a location adjacent a boundary layer between the melted material and unmelted material on the top thereof.

2 Claims, 6 Drawing Sheets

FIG_3

FIG_4

5,063,860

METHOD AND APPARATUS FOR MELTING MATERIALS CONTAINING INORGANIC MATERIAL FIBERS BY THE SUPPLY OF OXYGEN RICH GAS

BACKGROUND OF THE INVENTION

1. Field of the Invention

The present invention relates to a method and apparatus for melting materials containing fibers of inorganic material as well as organic substance and water, if any, in a furnace. The method according to the invention is particularly suitable for the melting of waste from production of mineral fibers, especially glass fibers, for which type of waste the percentage of fibers, organic substance and water can vary widely.

2. Discussion of the Background Art

One way of handling this type of waste from mineral fiber production is to dump it. For obvious reasons this is not a satisfactory method, particularly if the organic substance of the waste contains such substances as free phenol, formalin, oil or the like, which can cause environmental problems.

Melting is another method for the handling of this kind of fiber waste, which has been tested in many different ways, but without satisfactory results. Such a melting procedure is much more difficult to carry out in practice than might be imagined. When attempting to melt the waste by supplying external energy, a fairly solid melting mass is formed, which more or less stops the air supply to the organic substance of the waste. Furthermore, this melting mass has a doughy consistency, which is difficult to handle, especially if it sticks to the internal surfaces of the refuse incinerator. Also, waste fumes often contain unburnt gases, which cause air pollution. The problem cannot be solved in an economical way if the waste is exposed to very high temperatures in a conventional furnace, since it takes time before heat penetrates the material due to the low heat conductivity of the waste. The efficiency of such a construction is consequently very low.

Under these circumstances, experiments have been made to re-use the waste as raw material in glass furnaces, but this has proved to be possible only for waste having a small content of organic substance and with a very thorough decomposition of the fibrous waste, which also raises the price of the process considerably.

The melting method can be improved if the waste material is arranged on the surface of an existing melt in a special melting furnace, and melting heat is supplied by means of combustion heat from a number of burners arranged in the furnace, by means of current fed electrodes placed in the melt, or by means of current fed resistor elements built into the bottom of the furnace. A common problem for such methods, with which the waste is melted by heat from the environment, however, is that the energy consumption is high. Furthermore, it is still difficult to obtain waste fumes free from unburnt gases, and thus, the air pollution problem remains, at least partly.

SUMMARY OF THE INVENTION

An object of the invention is to improve the melting method by avoiding the above mentioned disadvantages.

Another object of the invention is to provide an improved apparatus for carrying out the method of the invention.

The above and other objects are achieved according to the present invention by a method of melting an inorganic material which is mixed with an organic substance, by the steps of heating the inorganic material and organic substance in a furnace to a temperature sufficient for the organic material to combust, and feeding sufficient oxygen enriched gas to the furnace that the combustion of the organic substance produces sufficient heat to melt the inorganic material.

According to another feature of the invention, an apparatus for carrying out the above method comprises a furnace having a wall separating the interior thereof into a melting section for melting the inorganic material and a discharge section for discharging the melted material and combustion waste gases. It also includes lower and upper outlet openings in the wall for respectively permitting the melted material and the waste gases to reach the discharge section, as well as a bottom outlet and a chimney in the discharge section for respectively discharging the melted material and the waste gas from the discharge section. Finally, means are provided for injecting the oxygen enriched gas into a boundary layer between the melted material in the melting section and unmelted inorganic material on top of the melted material.

The principal novelty of the present invention is that the fiber material is melted by means of heat which evolves inside the actual material when the organic substance is combusted, whereby the need for extra energy can be completely eliminated, as a rule. More specifically, the invention relates to a procedure for melting of material containing inorganic fibers as well as organic substance and water, if any, in a furnace. A characteristic of the method is the supply of pure oxygen to the furnace, or to the extent necessary, the supply of oxygen-enriched air, of which the oxygen content is preferably at least about 40 percent by volume. This procedure has proven to give a very fast and effective combustion of organic substances with clean waste fumes.

The melting method according to the invention is very effective and it reduces the need for extra energy drastically. By way of example a representative good value for a furnace with external heat supply and the melting capacity of 6.0 tons of waste per square meter in twenty-four hours, was a heat consumption of 600 kilocalories per kilo waste. According to the method of this invention, melting can be carried out with at least as high a melting capacity, but completely without energy consumption.

According to a preferred embodiment of the method, oxygen or oxygen-enriched air is supplied near the boundary layer between the melted mass and the fiber material on top, especially in the immediate vicinity of this boundary layer. Oxygen or oxygen-enriched air may be supplied from below.

It should be pointed out that the invention does not require a considerable amount of melted mass in the furnace. The melted mass may for instance consist of a thin bottom layer, from which discharge takes place continuously as the melting process goes on.

The method according to the invention may thus be carried out with the use of pure oxygen with excellent results. However, pure oxygen is not always needed; good results have been achieved even with a gas at a lower limit of about 40 percent by volume of oxygen. An even better preferred embodiment of the invention involves use of oxygen-enriched air, of which the oxygen content is at least about 40 percent by volume, preferably at least about 60 percent by volume. For certain applications, the limit of about 75 percent by volume can be an especially preferred lower limit.

The type of material which can be melted by means of the method according to the invention has been dealt with above. The material can, moreover, be defined by means of the well known term "adiabatic temperature", in accordance with the following: Combustion of the organic substance (normally a binding agent) in oxygen atmosphere takes place very fast and with considerable heat release. The heat is used for heating of all components, i.e. fibers, water and waste gases. The temperature, $T_x$, which is obtained if all heat loss is prevented (so called adiabatic temperature), can be calculated according to the following formula:

$$Tx = \frac{41.4 \cdot \frac{x}{y} - T_L + 5419 \cdot x + 560 - 520 \cdot z}{0.3545 \cdot x + 0.02343 \cdot (100 - y) \cdot x + 30.52}$$

where $T_x$ = adiabatic temperature (in degrees C.)

$x$ = binding agent content (%)
(energy value of binding agent = 5500 kilocalories/kilogram)

$y$ = oxygen content of air supplied (%)

$T_L$ = air temperature (in degrees C.)

$z$ = water content of waste (%)

In connection with melting of mineral fiber waste it has been proved that the parameters x, y, z and $T_L$ may be allowed to vary to a great extent without negative effect on the melting, on condition that the adiabatic temperature is sufficiently high. It has thus been proved that at an adiabatic temperature exceeding about 850° C., the waste material can melt with good results and with a varying value of the parameters in question, such as binding agent content of the waste, oxygen content of the oxygen-enriched air supplied, the temperature of the oxygen-enriched air and the water content of the material, etc.

A particularly interesting value of the adiabatic temperature is a lower limit of about 1200° C., as it has been found that melting of waste, the adiabatic temperature of which exceeds this limit, can take place in a furnace without any problems in making the melt run out of the furnace. At the above mentioned adiabatic limit the melt formed becomes so hot that it runs out of the melting furnace by itself, provided of course that the furnace is sufficiently insulated.

For waste with adiabatic temperatures below 1200° C. it has proved advantageous to supply more heat to the furnace, mainly to keep the bottom of the furnace hot, in order to facilitate the transport of the melted material out of the furnace. The extra heat supply in question can be provided according to to previously known methods.

It should further be emphasized that the combustion of the organic substance is extremely effective and that high oxygen enrichment means that the amount of the waste gases emanating from the furnace is relatively small. The reduced amount of waste gas means that the treatment of any environmentally hazardous substances released in the process will be simple and economical.

Finally, it might be added in this context that a test plant constructed in accordance with the above mentioned principles showed the following operation parameters when melting glass fiber waste with about 6% organic binding agent.

| | |
|---|---|
| Melting capacity: | maximum 6.0 tons/m² and twenty-four hours |
| Waste gas amount: | 150 Nm³/ton waste |
| Energy consumption for melting: | 0 |
| Energy consumption for keeping the bottom hot: | 80 kilocalories/kilogram waste (=0.33 MJ/kilogram) |

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings: wherein.

DETAILED DESCRIPTION OF THE PREFERRED EMBODIMENTS

Figure 1:
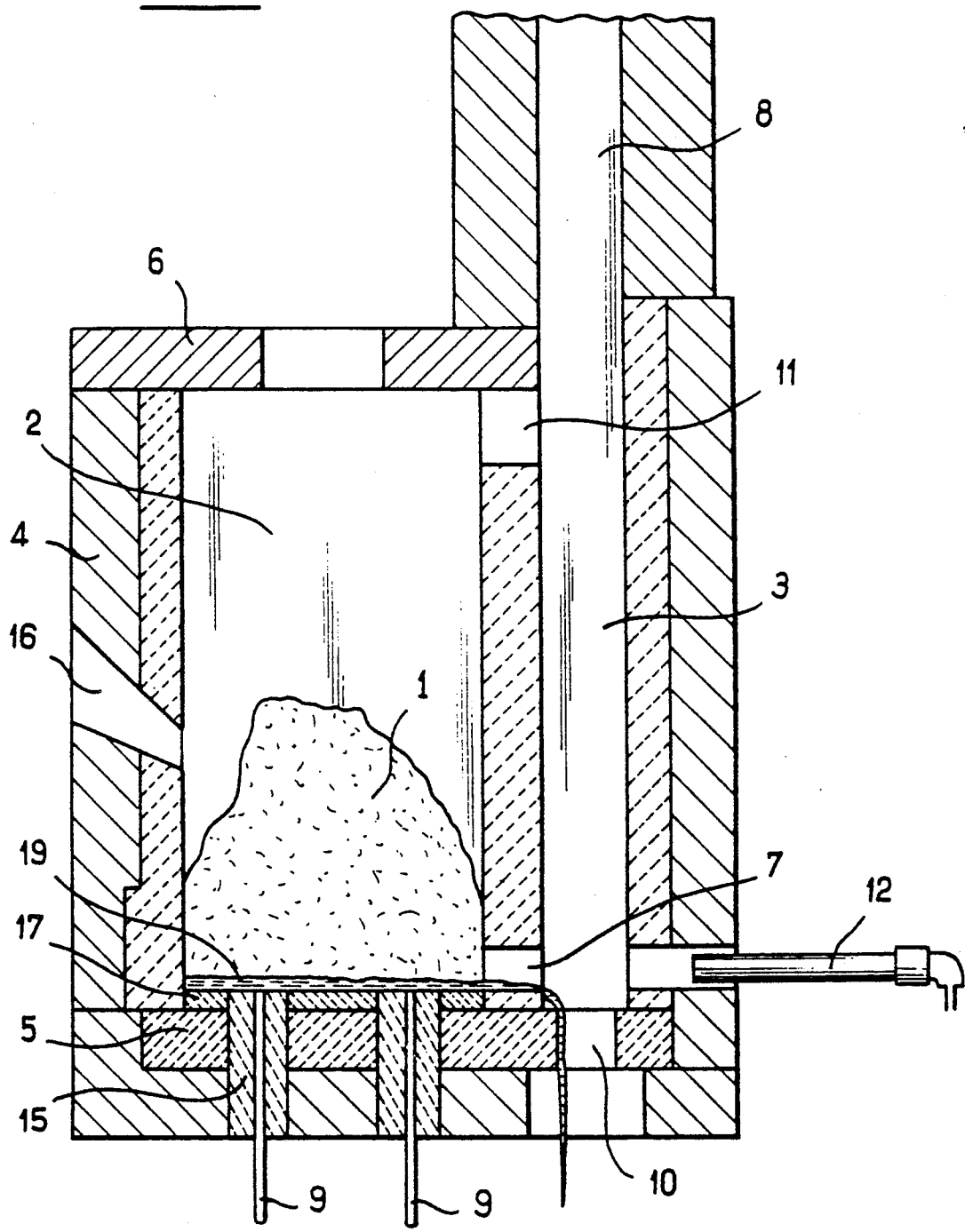
FIG. 1 is a sectional side view of a furnace according to this invention.

As several details of the different variants of furnaces presented in the different drawing figures are common for the different figures, the same reference numerals have been used for the same or equivalent details. This also means that the drawing Figures will be jointly described without special reference to the respective figures, with the exception of those features for which alternative details occur. Furthermore, the construction of the respective furnaces and their function are basically the same as in previously known techniques, with the exception, of course, of the new features which are characteristic of the present invention.

In FIGS. 1-6 waste 1 is placed in a hot furnace, which consists of a melting section 2 heated in a conventional manner which is not shown, and a discharge section 3. The melting section is marked off by walls 4 and bottom 5 and ceiling 6.

The organic content of the waste is ignited by the heat of the furnace, and combustion is maintained by an atmosphere rich in oxygen, which is supplied to the waste from below by a number of nozzles/valves 9 placed in special refractory bricks 15 at the bottom of the furnace 5. The waste melts under the heat of combustion and runs down towards the bottom of the furnace 5 and into the discharge section through the side outlet 7. After that the melt 19 leaves the discharge section through a bottom outlet 10. Waste gases from the combustion leave the furnace through an outlet 11 and a chimney 8, which is common for the melting and discharge sections.

A burner 12 is placed in the discharge section to maintain the temperature of the discharged melt, if required, in order to facilitate its transport out of the furnace.

The melting can be observed through an inspection aperture 16 in the wall 4.

As to the differences between the different drawing Figures the following applies:

In the embodiment according to FIG. 1 of the upper part of the bottom 5 is made up of a special bottom insertion 17, made of a material which is particularly resistent to the melted material. The nozzles 9 end on a level with the surface of the bottom insertion 17, which is on a level with the lower edge of the outlet 7. This means that there will be only a thin bottom layer 19 of melt at the bottom 5.

Figure 2:
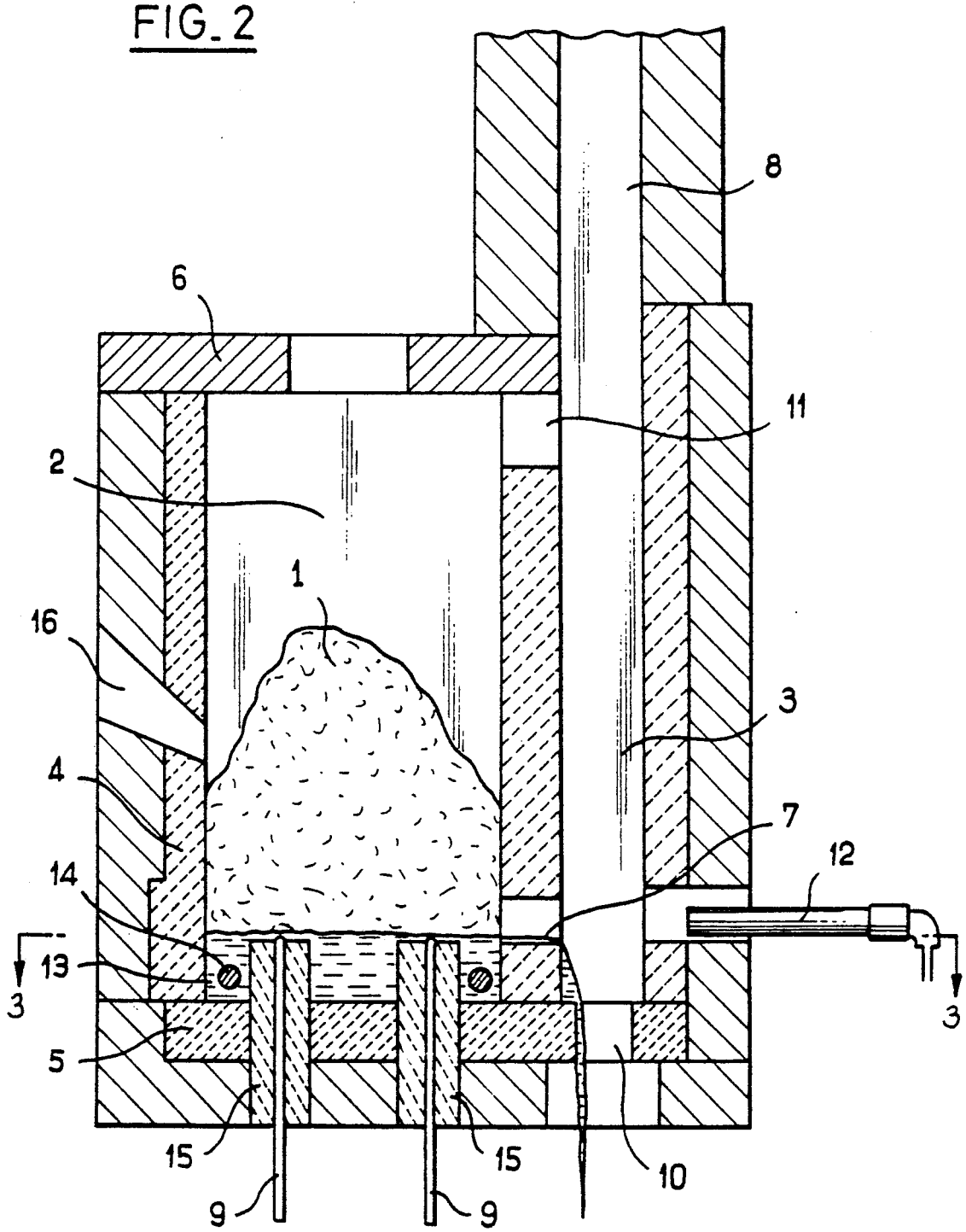
FIG. 2 is a view similar to that of FIG. 1 but showing a furnace operating according to the principles of this invention and in which extra heat is supplied to the bottom layer of melted mass by means of electric current, which passes through the mass.
Figure 3:
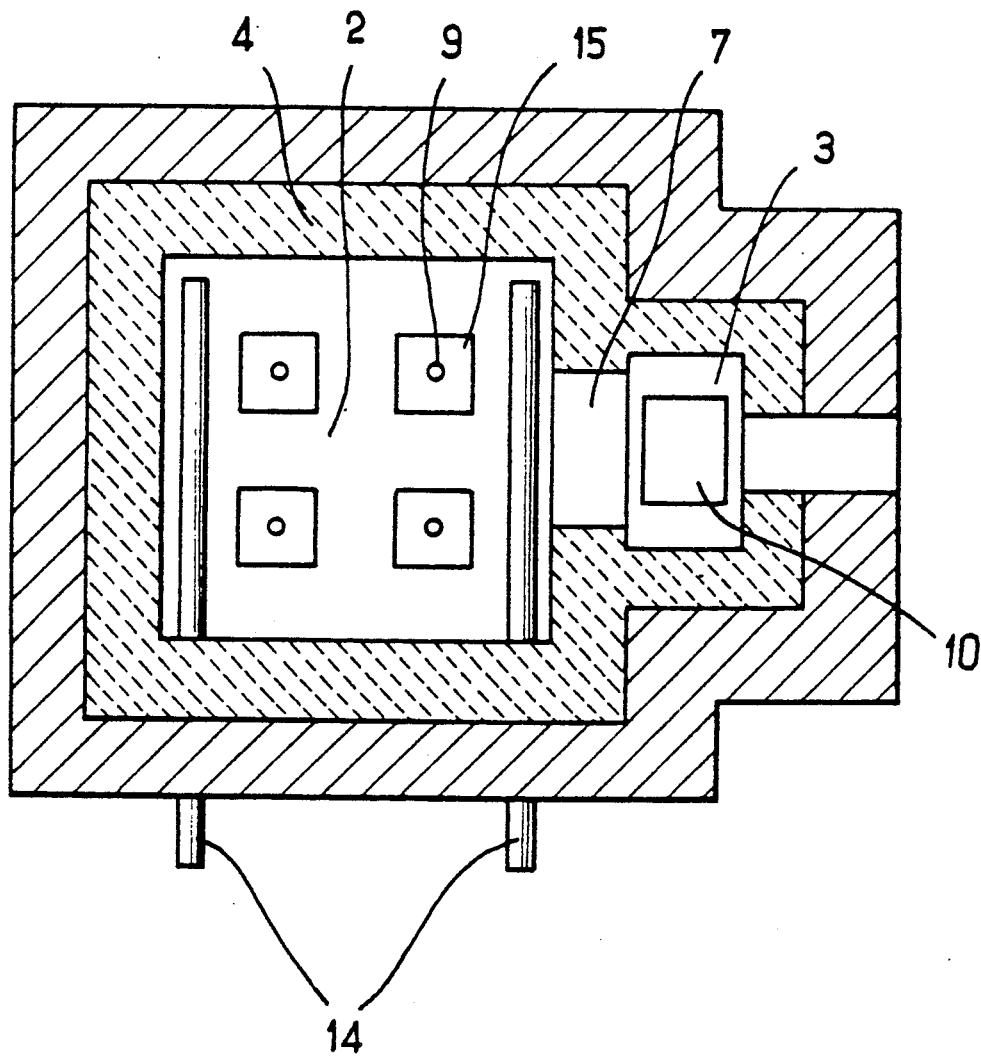
FIG. 3 is a view taken on the line 3—3 of FIG. 2.

In the embodiment according to FIGS. 2 and 3 the nozzles 9 with accompanying bricks 15 extend vertically upwards from the upper surface of the bottom 5, so the nozzle outlets are on a level with the lower edge of the discharge side outlet 7. Consequently, a melt 13 is formed in the lower part of the melting section up to the level of the discharge outlet 7. Electrodes 14 are arranged in this melt to transmit current, and with that also extra heat, in order for the melting temperature to be maintained and the discharge of melted mass to be facilitated.

Figure 4:
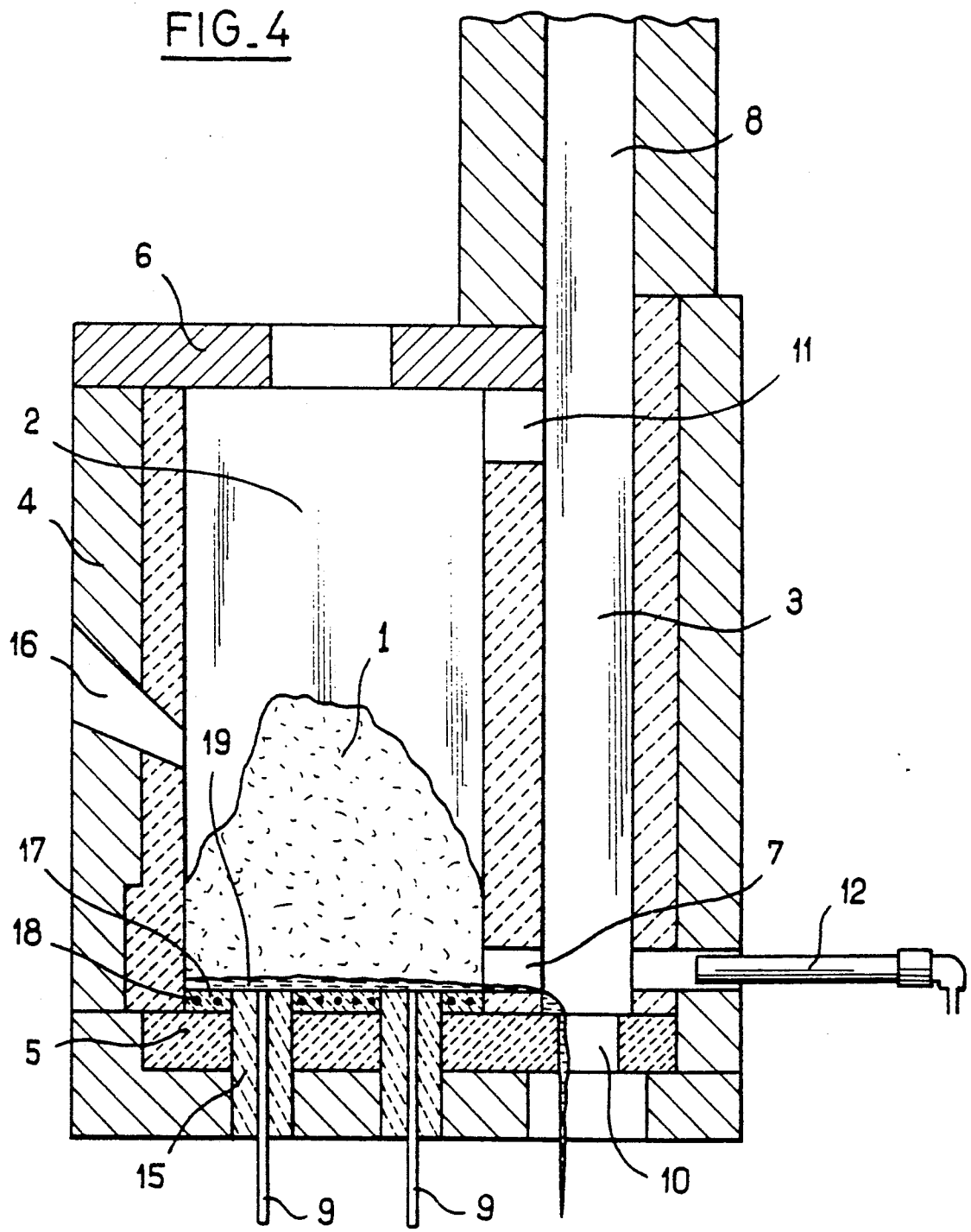
FIG. 4 is a sectional side view of another example of a furnace operating in accordance with the principles of this invention and in which extra heat is supplied to the bottom layer by means of electric current, which passes through resistor elements built into the bottom of the furnace.

The embodiment according to FIG. 4 corresponds to that according to FIG. 1 with the exception of electric resistor elements 18 being arranged at the bottom insertion 17 to maintain the heat of the melt, in order for the discharge from the furnace to be facilitated.

Figure 5:
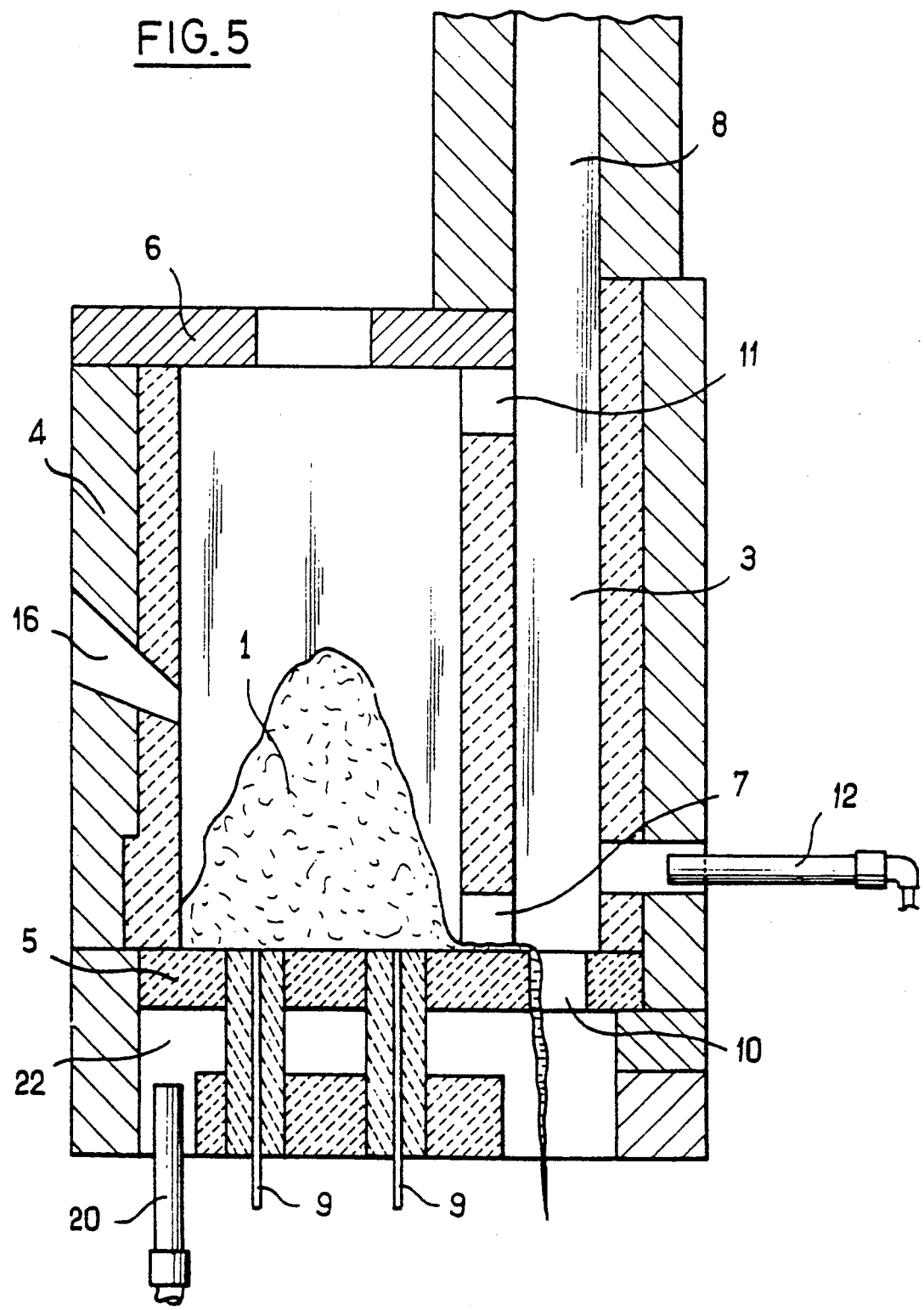
FIG. 5 is a sectional side view of another example, in which extra heat is supplied to the bottom layer by means of hot gases, which are generated with a burner and pass inside the bottom of the furnace.

As regards the embodiment according to FIG. 5, a burner 20 is arranged close to the bottom of the furnace, in which the bottom consists of a combustion area and channels 22 connected to this area for the passage of combustion gases, and thus supply heat to the refractory bottom of the furnace to keep it hot. The combustion gases also pass into the outlet 10 for the melted material, for discharge through chimney 8, whereby they further contribute to secure discharge of the melt material.

Figure 6:
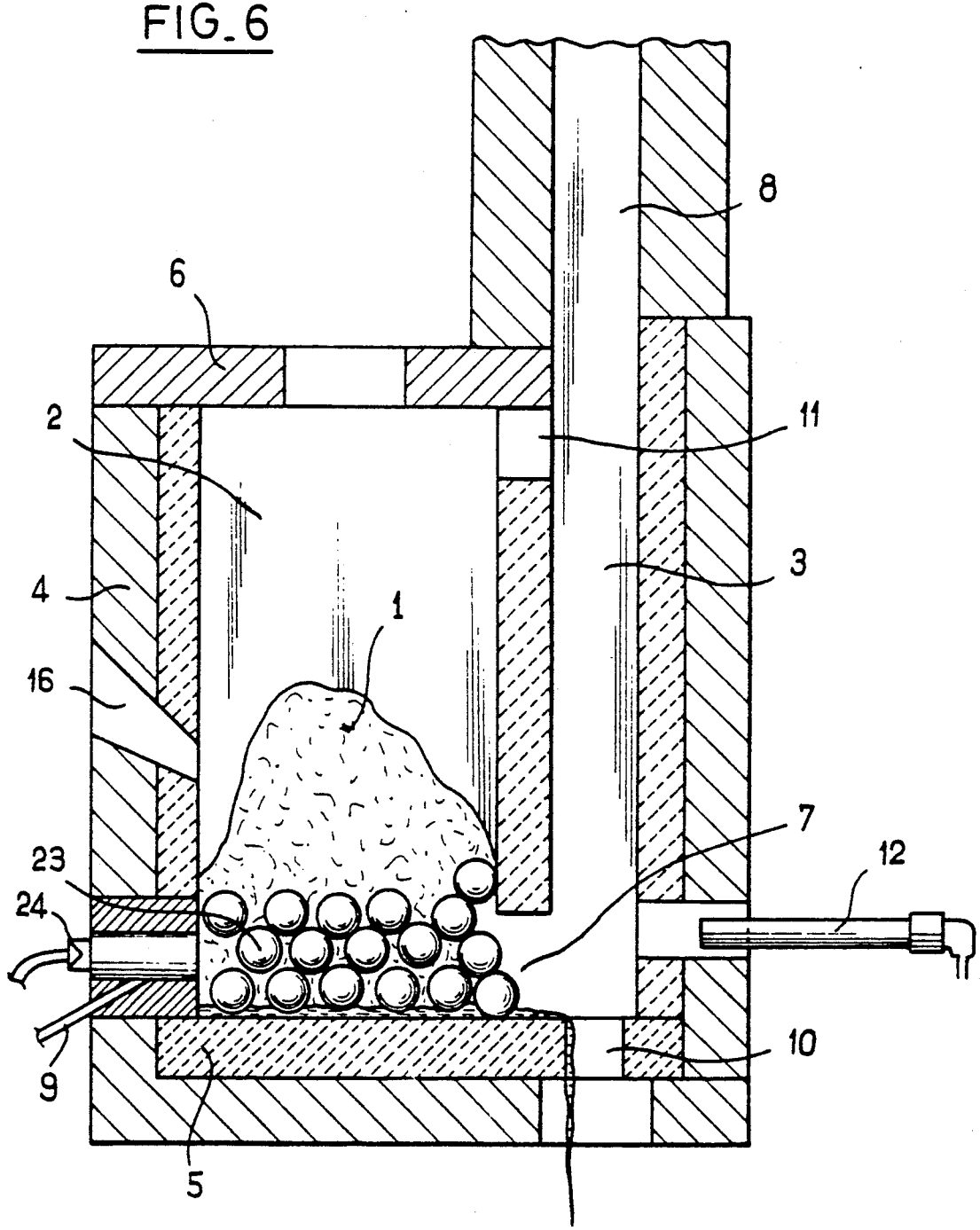
FIG. 6 is a sectional side view of a further example, in which the melted waste rests on a layer refractory bricks, which by its form gives admission for both oxygen or oxygen-enriched air to pass towards the waste and for the melted glass to pass towards an outlet.

Finally, as regards the embodiment according to FIG. 6, it contains a bed 23 of several layers of refractory bricks, which in this case have a spherical form, at the bottom 5 of the melting section 2 of the furnace. Furthermore, a burner 24 is arranged at the lower part of one of the side walls of the furnace for heating of the bed, if required. Contrary to the previously shown embodiments the nozzles/valves 9 for supply of oxygen or oxygen-enriched air into the bed 23 are not arranged to supply the oxygen or oxygen-enriched gas directly from below, but via a side wall in connection with the burner 24. The bed 23 has such a height that it covers the discharge outlet 7. The bed 23 contributes to the distribution of oxygen or oxygen-enriched air over the whole lower material surface.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of melting an inorganic material which is mixed with an organic substance, comprising the steps of:

heating the inorganic material and organic substance in a furnace to a temperature sufficient for the organic material to combust; and feeding sufficient oxygen enriched gas, having an oxygen content of at least 40% by volume, to the furnace such that the combustion of the organic substance produces sufficient heat to melt the inorganic material, wherein the inorganic material comprises inorganic fibers and the feeding step comprises feeding said oxygen enriched gas adjacent a boundary layer between the melted inorganic material and unmelted inorganic material on top of the melted inorganic material.

2. The method of claim 1, wherein said feeding step comprises feeding such oxygen enriched gas at said boundary layer from below.

* * * * *